Dec. 30, 1941.                H. E. SOMES                2,268,346
                          AUTOFRETTAGED HUB
                         Filed Sept. 22, 1936         3 Sheets-Sheet 1

INVENTOR.
HOWARD E. SOMES
BY
ATTORNEY.

Dec. 30, 1941.  H. E. SOMES  2,268,346
AUTOFRETTAGED HUB
Filed Sept. 22, 1936  3 Sheets-Sheet 2
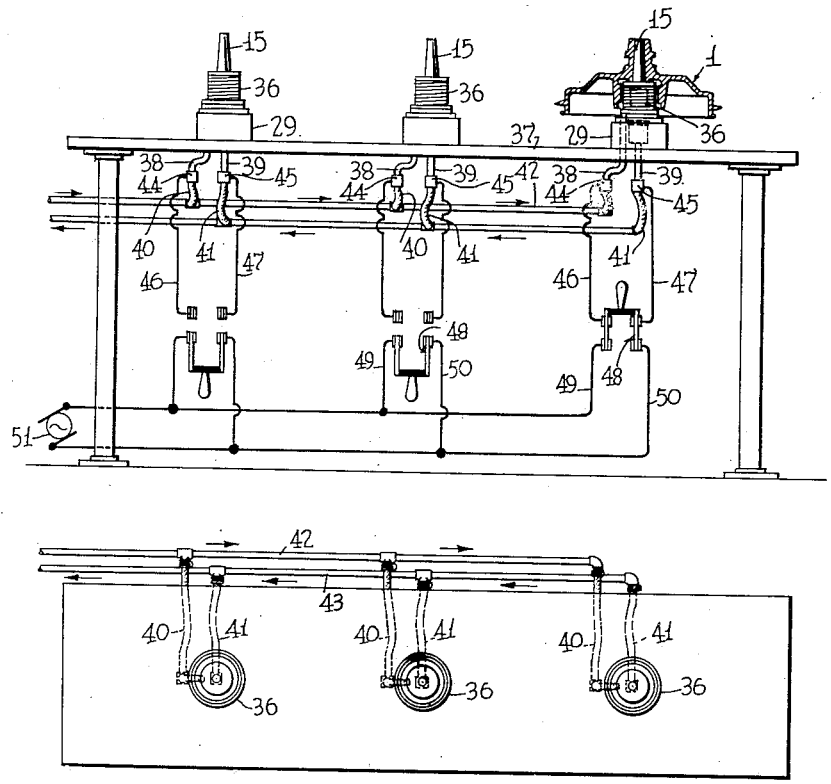
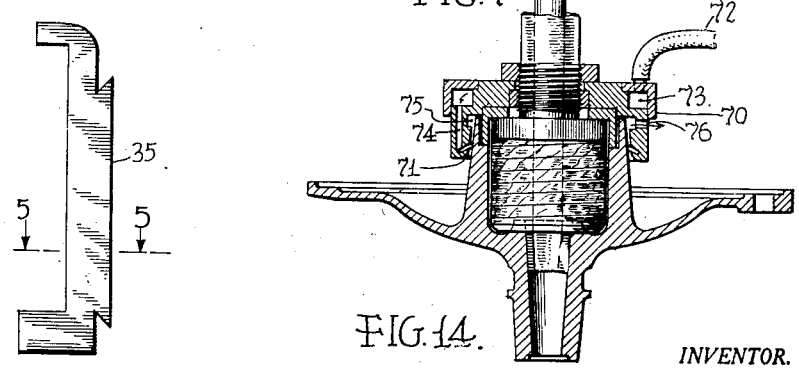
INVENTOR.
HOWARD E. SOMES.
BY
ATTORNEY.

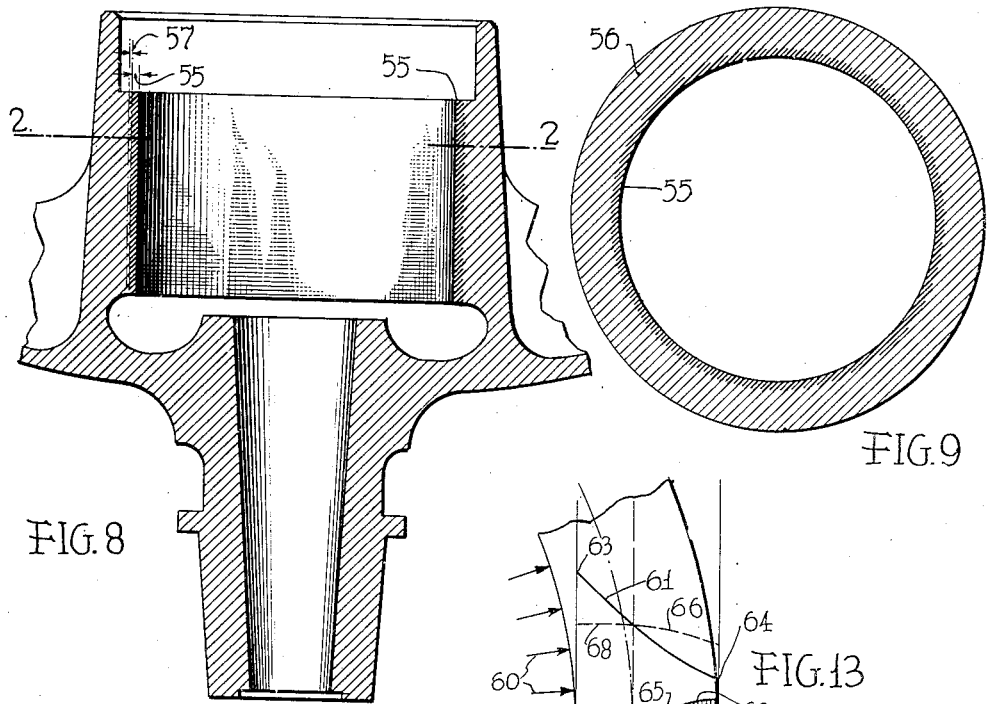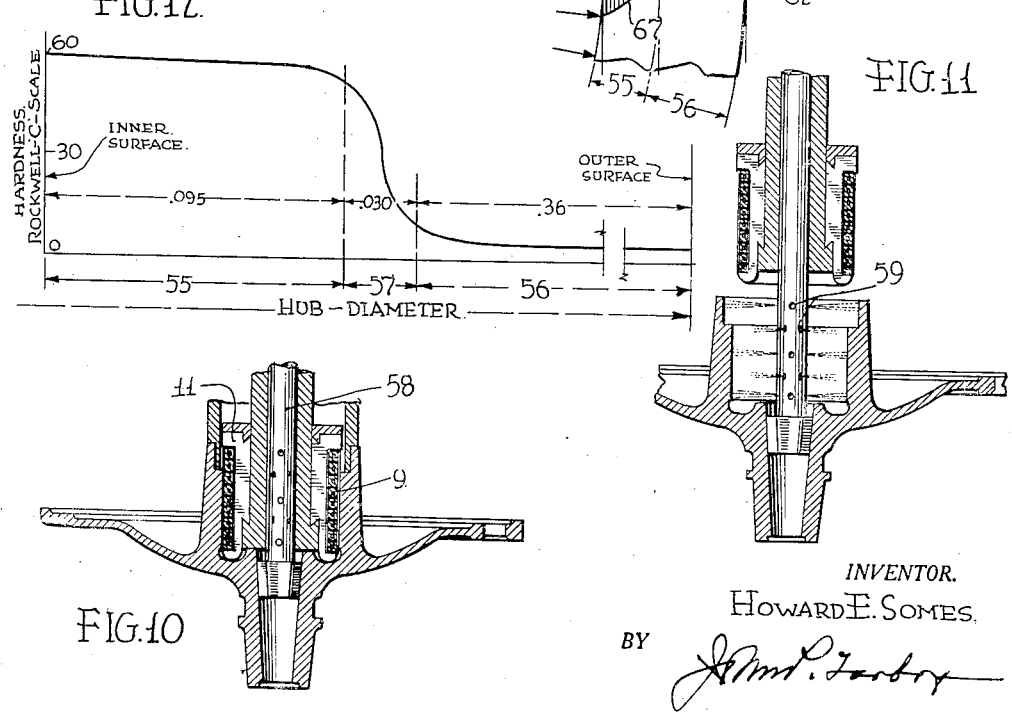

Patented Dec. 30, 1941

2,268,346

UNITED STATES PATENT OFFICE 2,268,346

AUTOFRETTAGED HUB

Howard E. Somes, Detroit, Mich., assignor to Budd Induction Heating, Inc., Philadelphia, Pa., a corporation of Michigan Application September 22, 1936, Serial No. 101,993
In England January 31, 1936

5 Claims. (Cl. 308—210)

This application is a continuation in part of my application Serial No. 50,829, filed November 21, 1935, now Patent No. 2,256,873, dated September 23, 1941, for Inside induction heater.

The present invention relates in general to the electromagnetic inductive heating of hollow bodies or the walls of hollow bodies from the inside thereof, for example, either where the walls or other portions to be heated are inaccessible from the outside or where they may be accessible from the outside but it is desired to heat a portion near the inner surface without unduly heating the outer remoter portions.

One practical application of the problem is the heating of the walls of a brake drum for any heat treatment either hardening, normalizing, or annealing, either to accomplish a permanent result or produce an effect useful as an intermediate step in a process, and where the outer surface of the drum is rendered inaccessible for the application of inductive windings as by the presence of ribs, lugs, or other projections, or where it is desired that the heat treatment be more or less restricted to or at least begin at the inner surface.

Another practical application of great value is in the quantity production of automobile hubs, integral hub and brake drum back-plate or integral hub and brake drum, where it is desired to do away with the usual separate internal bearing ring or cylinder of hardened material, by hardening the inner cylindrical portion of the hub so that it may act directly as the bearing surface or bearing race for roller bearings. The problem presented here is to raise the interior portion of the hub to the required temperature before the heat can travel by conduction to the more remote portions in sufficient quantity to unduly raise the temperature of such portions.

It is known to heat the walls of a hollow object or the exterior portion of the walls of a hollow object by electrical induction through the use of a coil surrounding the object, such coil having a magnetic circuit largely of air or non-magnetic material except insofar as the work to be heated, which constitutes a part of the magnetic circuit, may itself be of magnetic material. It has been found that this method is not economically practical for interior heating as above set out, especially where rapid heating of small inside diameters, in the neighborhood of a foot or less, is required.

Attempts to practice such interior heating with the usual air core type of coil or coreless inductor have met with failure, apparently due to the inability to pass enough current through the coil to do the work required in the time required without destruction of the coil and/or leads.

I have found that ample power input may be attained by providing the primary inducing coil or helix with an internal core of high permeability preferably built up of radial laminations or equivalent structure, resulting in a core highly conductive of magnetic flux but resistant to eddy currents and especially induced currents tending to travel in paths normal to the direction of magnetic flux. When high core temperatures are involved, it is preferable to construct the core of an alloy steel of such composition as to retain its magnetic qualities at high temperatures, for example, a cobalt and nickel steel in which a high percentage of cobalt is used, for example, 70% more or less. The core is so constructed as to form a close magnetic coupling through a minimum air gap with the wall or body portion of the object to be heated, usually of iron or an iron alloy.

This ability to effect a high rate of energy input is essential where the requirement is to harden the inner cylindrical surface of an iron or iron alloy automobile hub while preventing such heating of remoter portions of the hub as would alter its normal or desired qualities.

By shaping the laminated core to surround the inside and end portions of the primary inductor coil, to form with the portion of the iron body to be heated, a substantially complete housing or encasement for the coil, the magnetic flux is confined to such core and portion of the work with the advantageous result that proximate accessories and structural portions of the core such as the lamination locking rings, and centering mandrel for centering the induction heating unit in the hub, are protected from being traversed by a substantial amount of magnetic flux and at least to a degree sufficient to prevent undue inductive heating of such accessories.

It is a further object of my invention to so manifoldly reduce the reluctance of that portion of the magnetic path of the heating coil which lies internally of the hollow structure as to render it comparable in reluctance with the reluctance of that portion which lies exterior to the hollow structure. The provision of the internally located magnetic core does this. The heat treatment of the exterior surfaces of articles of circular section by electro-magnetic induction is readily accomplished by coils without external magnetic cores for the reason that the unlimited cross section of the atmospheric portion of the magnetic circuit insures an adequately low reluctance. When, however, the work itself, as in the heat treatment of the interior surfaces of hollow cross sections, constitutes the external magnetic path for the work coil, this situation is quite reversed. The fact that an interiorly lying atmospheric portion of the circuit is circumscribed by the work itself limits its area and therefore raises its reluctance. When hollow cross section bodies of small diameter, such for example as the automobile wheel hub, are being treated the area becomes so small that the reluctance may be as high as 10 or a dozen times that of the atmospheric portion of the magnetic circuit of the work coil when utilized for treating external surfaces. I believe this fact to be at the root of the earlier failures in attempts to heat bodies of hollow cross section by coreless inductors, and that this cause has not been appreciated prior to this, my invention. The amount of power required to heat treat a hollow body of relatively small diameter such as the automobile hub through the use of a coreless inductor would not only be economically prohibitive, but also it would be impractical to accommodate within so confined a space an inductor coil large enough to carry the extreme currents necessary to enable the coreless inductor to produce the flux required for such a heat treatment.

A further phase of my invention is the utilization of a rate of energy input so high as to produce in the hollow cross sectioned product the interior wall of which is being heat treated, a state of autofrettage to the end of a material strengthening of the walls. By a state of autofrettage is meant that state of the distribution respectively, of the compression strains obtaining in the inner heat treated wall and the tension strains obtained in the outer and un-heat treated wall which smooths out the peak of the strain curve of the wall as between its interior and its exterior. The principle of autofrettage has been well recognized in gunnery and has usually been achieved either by shrinking on external reinforcing tubes, rings or bands, or by internal compression of the inner zones of the wall under high hydraulic pressure, but so far as I am aware, I am the first to achieve this in an integral wall structure through heat treatment by electromagnetic induction.

According to the method of my invention I achieve this condition through heating at such a high rate of energy input, so extremely rapidly as to avoid gradual heat gradients between that inner zone heated beyond the recalescent point and that outer zone retained at a temperature so low that it aids materially in the quench, that there is an abrupt difference in temperature between the two zones, by stopping abruptly the input of energy when this temperature is reached and by quenching before there has been a change in these temperature relations of the zones of the work and quenching so abruptly and with so uniform a rate as applied to the zone at recalescent temperature that not only is there an abrupt change in hardness from the inner heated zone to the outer unheated zone, but also the hardened zone is of a uniform and manifoldly increased hardness while the outer zone is uniformly of its normal hardness unaffected by the heat treatment. Yet further, I contemplate the attainment of a condition of autofrettage, and an increase in strength by so regulating the degree of hardness and the thickness of the inner hardened zone as respects the thickness of an outer and unhardened zone that the strain curve of the aggregate thickness of wall is such as to increase its strength.

Another object of my invention is the hollow cross section product having integral one piece walls in a condition of autofrettage affording highly substantial increase in strength thereof. This object applies peculiarly to relatively thin wall structures of relatively small diameter, diameters of the order of the barrels of automobile wheel hubs and of automobile engine cylinders and the like.

In the quantity production of certain articles it has been found possible and highly advantageous to slightly vary the form of the object to be treated, in the present instance a wheel hub, to render it more susceptible to rapid heating by induction with minimum heat and power losses and without the sacrifice of mechanical strength or interference with its intended mechanical functions.

The above and various other objects and advantages of the invention will be more clearly understood from a perusal of the following specification and the drawings accompanying the same.

The invention is illustrated in the accompanying drawings in which:

Figures 4 and 5 show plan and sectional views, respectively, of a modified form of lamination, Figure 6 is a diagrammatic front elevation of a group arrangement of heating elements, and Figure 7 is a plan view of the apparatus arrangement of Figure 6.

Figures 8 and 9 are respectively axial and trans-axial cross sections of the heat treated portion of an automobile wheel hub in a condition of autofrettage.

Figures 10 and 11 are, respectively, axial cross sections of an improved form of my apparatus illustrating one of the improved methods by which I obtain full and immediate quenching, Figure 10 showing both the work coil and spray in working position with respect to the work and Figure 11 showing the work coil removed and the spray in action.

Figure 12 is a curve showing the hardness of the various portions of a wall thickness and the relation between the inner and outer zones of the wall, and Figure 13 is a very greatly magnified view of a portion of a transaxial cross section of the wall of a product, showing the stress distributions therein both before and after treatment.

Figure 14 is a side elevation partly in section showing an arrangement for outside cooling during heating.

Figure 1:
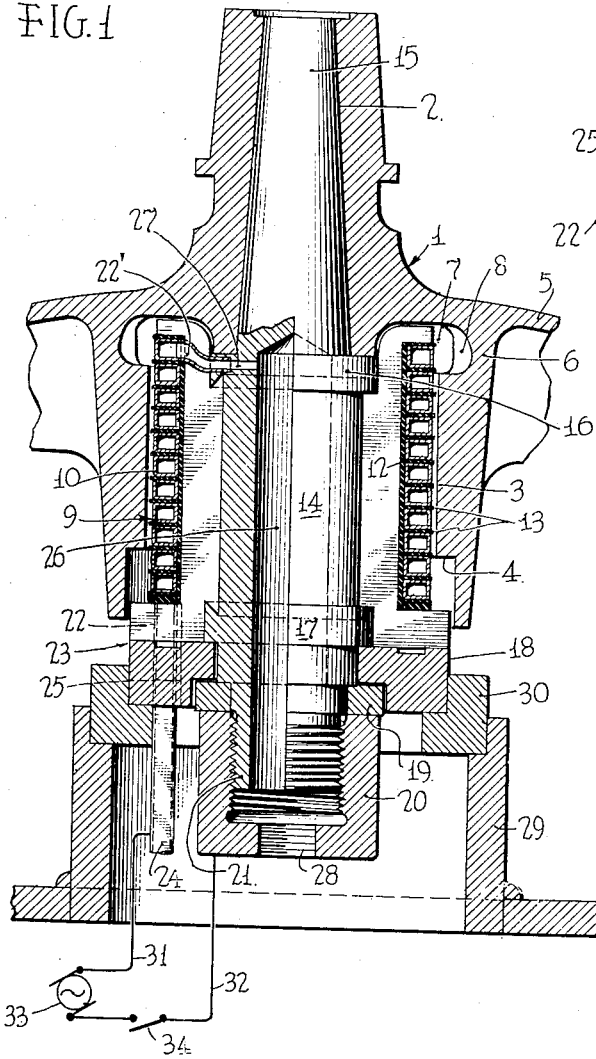
Figure 1 is a longitudinal axial section of a preferred form of the invention showing a portion of the central core in elevation.
Figure 2:
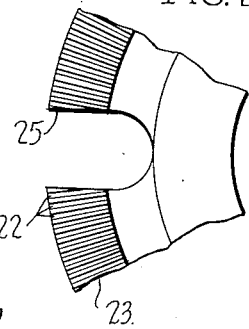
Figure 2 is a fragmentary detail view showing a portion of the lamination spacing-ring in elevation.

Referring to the drawings in detail, and first to Figures 1 and 2, the invention is here shown applied to the internal heating of an automobile wheel hub for heat treating an inner integral portion designed to act as a bearing race for the wheel.

The hub member 1, may be the hub portion of an integral hub and brake-drum, integral hub and brake drum back, or simply the hub member of any type of wheel carrying an internal roller-bearing race. The hub is provided with the usual tapered axle bore 2 at its outer end and a relatively large roller bearing bore 3 at its inner end, the bearing bore being provided on its inner wall with a radially inwardly projecting portion forming an integral, bearing-race member 4, which in the present instance is to be locally hardened at and near its inner surface by suitable localized heat treatment at and near the inner surface so as to take the place of the usual hardened steel insert, as a bearing-race member.

The hub here shown is of the type carrying an integral brake drum back, a portion of which near the hub is indicated at 5. The hub has the standard cross sectional contour with certain variations conducive to electro-magnetic inductive heat treatment as hereinafter described, without interference with the desired mechanical functions of the hub or any lessening of its mechanical strength.

This variation from the known form consists mainly in a slight narrowing of the annular section indicated at 6, preferably by outwardly deepening the annular recessed portion 7 and adding strengthening metal in the form of ribs 8 to compensate for the metal taken away, the ribs 8 being arranged to extend longitudinally and axially so as to lie in planes substantially at right angles to the path of induced currents. The portion 6 may also be reduced by taking away a portion of the metal on the outer surface thereof, substituting strengthening ribs arranged to offer the maximum radiating surface and suitably orientated to offer maximum impedance to induced currents. The latter construction may be either alternative to or in addition to the former. However, it will be noted that by outwardly deepening the recess 7 and using the ribs 8 for strengthening, the demarcation of the inwardly extended, annular race portion is accentuated thus aiding in the localization of heat generated therein.

Arranged to fit within the hub and in close spaced relation with the inner surface 3 of the bearing race portion of the hub, is the electromagnetic inductive heating element comprising in general an inductor helix 9 formed of a tubular conductor 10 having a hollow cylindrical, highly permeable, laminated core 11 extending radially outwardly over the top and bottom ends of the helix into close proximity to the inner wall of the wheel hub, the convolutions of the conducting helix being suitably insulated from the core and from each other by a sleeve 12 and washers 13 of mica or other suitable insulating material. It is also contemplated to use in place of either or both the sleeve and washers, insulating enamel of known or other suitable form.

The heating element is sturdily constructed and is carried firmly and strongly on a mandrel support 14, tapered at its upper end 15 to fit snugly into the tapered bore of the hub and provided with a center bore in its lower portion for water cooling as will be hereinafter described. The laminations of the core 11 are arranged radially about the mandrel 14 and clamped in place thereon by means of the upper stationary clamping ring 16 and the lower movable clamping ring 17, the lower clamping ring 17 being clamped upwardly against the laminations through the base ring 18 and foot ring 19 by the hollow clamping nut or cap 20 threaded on to a reduced lower portion 21 of the mandrel 15. For angularly spacing the laminations of the core 11 the lower outer portions of the laminations are nested individually in angularly spaced radial slots 22 from the top of peripheral marginal portion 23 of the base ring 18. The base ring thus holds the laminations on the mandrel, in the proper radial arrangement, while the clamping rings 16 and 17 hold them in good thermal contact with the mandrel, thus greatly facilitating heat exchange between the core and the water-cooled mandrel. The angular spacing of the laminations affords excellent insulation between the laminations at those portions in which the flux density is greatest.

The lower terminal 24 of the conducting helix projects downwardly through an opening 25 in the base ring from which it is air insulated by proper spacing, although suitable solid insulation may be used. This extension is for electrical connection with one terminal of a suitable source of alternating current supply, not shown, and for connection with a suitable source of cooling fluid also not shown, but which may be of any known or other suitable form, while the upper terminal 22' extends into the internal bore 26 of the mandrel, through an opening 27 in the wall of the hollow portion of the mandrel and in fluid tight connection therewith, the electrical connection of the upper coil-terminal to the other side of the current source as well as the fluid path connections, being completed through the mandrel by suitable electrical connection and fluid tight coupling with the clamping nut 20, the lower end of the nut 20 being provided with a tapped opening 28 for this purpose. It is further contemplated to insulate the upper terminal of the helix from the supporting mandrel and laminated core by extending an insulated continuation of the conductor tubing down through the mandrel for outside electrical and fluid connections. The heating element is supported in a supporting base 29 through a seating ring 30.

Figure 3:
Figure 3 is a fragmentary perspective view on an enlarged scale of a modified form of tubular conductor.

The parts of the heating element and the article to be treated are so proportioned in relation to each other that when the hub member 1 is set down upon the heating element 2, the heating element will be properly centered and positioned within the hub by means of the tapered upper extension 15 and the upper shoulder of the clamping ring 16 with the outer surface of the convolutions of the conductor helix, or primary inductor, positioned parallel to and in close proximity to the inner surface of the annular bearing portion of the hub to be heat treated, and the helix substantially wholly surrounded or encased, partly by the body material of the hub and partly by the laminated core 11, which latter extends around over the inner surface of the helix and radially outwardly over the top and lower edges. It will be clear that the structure here described affords an extreme concentration of the electro-magnetic energy with minimum losses through magnetic leakage or dissipation of the flux and induced currents. To add further to this concentration of electro-magnetic energy, especially where high frequencies are used, the tubular conductor composing the conductor helix may take the form shown in Figure 3. In this form the conductor is made with a relatively thick outer wall and relatively thin inner and top and bottom walls, the outer wall functioning mainly as a conductor for the outwardly concentrated energizing current while the inner and top and bottom walls function mainly to hold the cooling fluid. However, in many cases the conductor may be made solid, of rectangular or round cross-section and relatively massive, where the duty cycle is not so severe. To reduce absorption by the conductor of heat radiated from the surface of the work, and thus tend to maintain its current carrying capacity undiminished, the conductor may be plated and buffed on its exposed surface to render its surface highly reflecting. While it is known to effect thermal insulation by reflection, the use of this kind of insulation as and for the purpose herein disclosed, and the arrangement whereby it is utilized is believed to be new and to constitute invention in its conception. A further advantage of the reflecting surface as herein used is that it not only prevents heating of the conductor by absorption of heat radiated from the work but promotes rapid heating of the latter due to the reverberatory effect produced between it and the work. It is preferable to plate the conductor for instance with chromium, the chromium coating being oxidized to secure a film of high electrical insulating value and, after assembly in the heating fixture, to buff, burnish or otherwise polish the exposed surface to secure a highly reflecting surface of high thermal insulating value.

Figure 5:
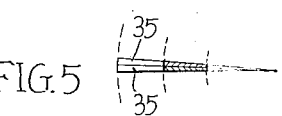

It is further contemplated to increase the flux carrying capacity of the laminated core by tapering the laminations radially inwardly as shown in Figures 4 and 5, so that the laminations 35 will lie in contact along radial planes and form in effect a substantially solid core ring. In this form the laminations would of course be insulated or partially insulated in any known or other suitable manner as by oxidation.

In operation the terminal 28 and the clamping nut 20 which form the electrical terminals of the primary inductor helix are connected through conductors 31 and 32 to a suitable source 33 of alternating current, preferably of high frequency, the duration of connection being controlled by a suitable switch or other current control device indicated diagrammatically at 34. Upon the application of such current, the primary inducing helix is energized to set up a strong magnetic flux concentrated in the core 11 and the annular race portion 4 of the hub. Due to the mechanical and electrical relation of the assembled parts, the induced currents are concentrated at the innermost portion of the bearing portion 4, raising the temperature of the bearing portion to the hardening temperature, after which the current supply is discontinued and the hub removed, and immediately quenched in order to produce the desired local hardening. During energization of the helix 11, heat is dissipated from the heating element by the circulation of a suitable cooling fluid through the hollow conductors of the helix 11 and the central bore 26 of the supporting mandrel 14. As the mandrel 14 is in good thermal contact with the magnetic core 11, heat interchange takes place therebetween cooling the magnetic core. The circulation of cooling fluid is preferably maintained continuously so as to continue the cooling off of the heat unit after de-energization of the coil and removal of the hub.

During the heating operation, as the temperature of the extreme inner portion of the bearing portion 4 reaches the recalescence temperature the zone of maximum current density moves outwardly, but the rate of energy input is made so high that the generation of heat in the outer portion of this outward shift of the zone of maximum current density, and any undue heating of the outer portion by conduction from the inner portion, will not take place before the inner portion has been raised to the desired hardening temperature. In fact, this temperature rise is effected so rapidly that the outer annular portions and other adjacent portions will remain sufficiently cool to aid in a quenching or cooling of the bearing portion with such outer and adjacent portions remaining well below the hardening temperature so as to preserve the desired mechanical characteristics of the remaining portions of the hub.

In Figures 8 and 9 I show the product as completely heat treated by my method and as so heat treated having walls in a condition of autofrettage. Parts the same as those described with the aid of Figure 1 are provided with reference numerals so far as needed, the same as those in Figure 1. The inner heat treated and hardened zone I have designated specially 55 and shown it by dense cross hatching, the outer and unheat treated zone having normal hardness as prevailing before the heat treatment of the zone 55 as designated 56. The interconnecting material between these two zones I designate 57.

In Figure 12 I have shown a curve of hardness of the different portions of the wall from the interior on the left to the exterior on the right, the scale of hardness being the Rockwell C scale. The normal hardness is of the order of 10 in the outer zone 56. The hardness of the inner heat treated zone is of the order of 58 or 60. The zones and the interconnecting material have been given by dimensionally applied lines on the diagram of Figure 12 the same reference numerals as used in connection with Figures 8 and 9. Note that the hardnesses of the inner heat treated zone 55 and the outer unheat treated zone 56 are substantially uniform throughout their radial extent. Note that the interconnecting material 57 is of extremely small extent approximately only 3/100 of an inch (note the scale graduations on the base line). The transition between the hardened zone 55 and the unhardened zone 56 is therefore extremely abrupt.

Not only is the uniformity of hardness as applied to the respective zones and the abrupt transition therebetween especially notable, but also of especial note and all contributing to the highly substantial increase in strength incident to autofrettage are the following: The radial thickness of the hardened zone is substantially uniform through its annular and axial extents. The product has not been distorted in dimension as a result of the heat treatment, being possessed of its identical geometrical form possessed before heat treatment. It is neither axially nor circumferentially out of true. Moreover, the dimensions of the finished interior surface of the zone 55 have not been altered more than one or two thousandths of an inch. These things collectively make not only for materially increased strength, but also for economic production through minimizing of machine and grinding operations on the hardened surface, perhaps eliminating both machining and grinding operations on the hardened surface, improving the operation and the uniformity and durability and wear of the product, and imparting to it improved fatigue characteristics.

As heretofore stated, this condition of uniformity of the hardened zone is brought about through the extremely brief period of the energy input at an extremely high rate about 15 to 20 k. w. for square inch of surface treated, and such that there is a very minimum of graduation if any, of temperature between the heated zone and that unheated exterior zone, which due to its relatively unheated condition so materially aids in the quench, through an abrupt cut-off of energy when this condition is reached, followed or accompanied by an abrupt quench jointly by the unheated material of the outer zone 56 and auxiliary quenching means. The rate of energy input is so great that the zone 55 is heated to the recalescent temperature and somewhat beyond in from one to two seconds in each case of one automobile hub which I am treating currently, the input of energy being the full power of a 300 kilowatt generator of a frequency of 2520 cycles minus only such losses as are incident to short, efficient transmission lines and a power factor maintained high jointly by appropriate capacitants and more importantly the inner magnetic core which is provided in this small diameter thin wall hollow structure according to my method.

Any known means of quenching may be used and I have used bath quenching, but in Figures 10 and 11 I disclose an improved form of apparatus over and above that shown in Figure 1 embodying a spray head 58. This spray head is introduced through the hollow of the core 11 and when the core 11 and the work coil 9 are in operative relation to the work the spray head 58 is also in operative relation. However, during the one or two seconds the energy of electromagnetic induction is being applied there is no cooling medium sprayed through the head 58. At the close of the heating period, however, core 11 and the coil 9 which it carries are abruptly withdrawn vertically axially of the spray head 58 as shown in Figure 11 and in the same instant or simultaneously therewith. Just so soon as the work coil clears the spray openings 59 the cooling medium is applied by hydraulic pressure through the head 58 uniformly to the entire heat treated zone 55 through a multiplicity of uniformly distributed openings 59. This avoids a complication of quick handling machinery or quick manual handling of the hub and greatly enhances the commercial application of my process and quantity production of my product. Through the use of this spray head introduced through the hollow of the magnetic core and lying in readiness during the heating operation first cost of machine practiced by my invention and the labor cost in quantity production are materially reduced. Moreover, the degree of abruptness of the change in hardness in the connecting material 57 may be regulated through regulation of the spray and without the necessity for re-adjustment or re-design of an entire machine or the entire series of handling operations.

Either liquid or gaseous spray fluids or a mixture of the two may be used, and where a liquid is used it is preferable to supply it through the nozzle in sufficient quantity and at a sufficient rate to not only pass through the lower opening in the hub but to overflow the hub and pass around the outside of the hub barrel and over and around the flange portion of the hub.

It is also desirable in some instances, especially in the treatment of thin walled objects, to cool the outside of the wall during the heating step in the process. An arrangement for carrying out this combination of steps is shown in Fig. 14, in which there is provided a cooling hood 70 arranged to extend down over the upper and thinner portion of the wall of the hub barrel, leaving a space 71 between the hub barrel and the inner side wall of the cooling hood. A cooling fluid, preferably gaseous, is supplied by way of a suitable flexible connection 72, annular manifold passage 73 and vertical passages or ducts 74 to the radially inwardly and axially upwardly directed annular outlet from whence the cooling fluid is directed upwardly against the outside wall of the hub barrel. The cooling fluid passing upwardly along the outside wall of the hub barrel continues on upwardly to an annular exhaust chamber or recess 75, exhausting through exhaust ports 76 extending outwardly through the side wall of the hood in staggered relation with the vertical ducts or channels 74. It will be understood that by suitable proportioning of the total area of the exhaust ports and other parts and suitable regulation of pressure, the fluid may be made to pass upwardly and out of the exhaust ports and even to produce some venturi effect, or may be made to flow partly upwardly and partly downwardly over and around the outside of the hub.

Perhaps a better idea of the source of the increased strength of wall of the thin walled hollow cross sectioned product may be had from the stress diagram of Figure 13. Here the several zones of material are designated by the numerals 55, 56 and 57 with the same meaning. The integral one piece thin wall structure before the heat treatment of my invention in the instance of internal pressures uniformly applied to its walls as indicated by the arrows 60 would result in a distribution of stress as between the interior and exterior portions of the wall represented by the stress curve 61 which is based on the radial line 62 of the thickness. Here it will be observed that the highest tension stresses are those at the innermost surfaces of the zone 55, appearing at the peak 63 of the curve, and the lowest stresses are stresses of tension obtaining in the outermost surfaces, as appearing at the lower end 64 of curve 61. It is the presence of the peak stresses in the portion 63 and those adjoining, of the curve 61, which are the source of weakness when the structure is subjected to internal pressure tending to radially disrupt it.

When the zone 55 has been hardened by my process and is connected with the outer zone 56 by the relatively thin body of transition material 57 the material of the wall is placed under initial stresses according to the curve 65 which it will be noted extends from the interior below the line 62 to the exterior above the line 62. Below the line 62 and within the confines of the zone 55 the stresses are compression stresses negative in value as distinguished from the positive tension values illustrated in curve 61. Above the line 62 and within the confines of zone 56 the tension stresses are of a positive value.

Now when the disruptive forces indicated by the arrows 60 are applied interiorly, instead of resulting in a strain distribution according to curve 61, the result is a strained distribution according to curve 66. This curve is a compound of the stresses of curve 65 as introduced through my treatment and the disruptive stresses which would have been introduced if the structure had not been so treated. The forces of compression defined by the ends 67 of curve 65 are subtracted from the tension forces of curve 61 lying in the same zone 55 resulting in the portion 68 of curve 66, whereas the forces of tension on the end 69 of curve 65 are added to the forces of tension on the end 64 of curve 61. The result is a smoothing out of all the stresses which would otherwise have been introduced in the structure and a unifying of the stresses upon the material body at large. In this lies the substantial increase in the strength of the structure incident to autofrettage.

Tests made of the cylindrical walls of hubs treated according to my invention show conclusively that the inner portion of the wall is under compression while the outer wall is under tension. This test consisted in the removal of successive layers of metal from the outside and the taking of measurements of the inside diameter after the removal of each layer. It was found that near the open end of the treated portion of the bearing recess in an average of readings on inside diameters in three different directions on each of three different hubs, the diameter increased an average of .007 of an inch, approximately one one-hundredth of an inch.

While I am not at present aware of exactly what changes take place during the treatment to bring about this resultant state of autofrettage, it is believed to be due in part to cold working of an intermediate zone beyond its elastic limit by thermal expansion of an adjacent inner zone, and in part to atomic enlargement accompanying a conversion of the material of the inner zone from austenite to martensite.

In the quantity production of articles with portions heat treated in accordance with the present invention, a group of heating units may be arranged to be continuously cooled while being used one at a time in seriatim through the provision of a permanently connected cooling system, preferably common to the group, and means for individually energizing and de-energizing any one of the heaters without interrupting the operation of the cooling means, thus affording ample cooling time for the heating units between operations without loss in production.

Such an arrangement is illustrated diagrammatically in Figures 6 and 7, wherein is indicated a group of the heating elements 36 conveniently mounted upon a suitable support such as the bench 37 with metallic tubular extensions 38 and 39 leading from the coil terminal 24 and tapped terminal 28 (Figure 1) through suitable high resistance or insulating conduits such as rubber hose connections 40 and 41, to input and output cooling fluid manifold connections 42 and 43, respectively. Suitable electrical connection is made between the tubular terminal extensions 38—39 through terminals 44—45, conductors 46—47, switches 48 and conductors 49—50 to a suitable source of alternating current 51.

In operation cooling fluid is continuously supplied to the group of heaters 36 through the manifolds 42—43 from a suitable source, not shown, while the operator places an article such as the integral hub and brake drum 1 on one of the heating elements 36, for example, the one at the extreme right hand end as indicated in Figure 6. The operator then energizes the heater 36 by closure of the extreme right hand switch 48 for the required period of time, after which the switch is opened and the hub 1 removed and quenched. The operator then proceeds to use another of the heaters, for example, the middle heater, and so on through the group of heaters in seriatim, the remaining heaters continuing to cool while not in use.

Although the several heaters are mechanically connected in multiple to the cooling connection manifolds 42—43, they are adequately electrically insulated for individual electrical energization through the use of individual cooling connections 40—41 of insulating material such as rubber hose or fabric-reinforced rubber hose or the like, of sufficient length to effectively electrically separate the heaters by the electrical resistance or insulating quality of the cooling fluid. Any known or other suitable method of preventing undue loss of energy through the cooling system may be availed of especially where water is used as the cooling fluid. For example, each heating unit may be provided with a separate and independent cooling system with separate pumps and reservoirs.

Although the switches 48 have been shown as hand operated bipolar knife switches for the sake of simplicity of disclosure, it is desirable in practice to use foot operated switches instead, so that the operator may readily close the circuit immediately after placement of the work and will have his hands free to remove the work immediately after opening the switch. Also any known or other suitable form of timing means may be used for timing the duration of circuit closure, either purely chronometric, or variably in response to magnitude of energy input, temperature rise, etc.

While I have herein shown and described certain specific embodiments of the invention for the sake of definite disclosure, it is to be understood that the invention is not limited to such specific embodiments but contemplates all such modifications and variants thereof as fall fairly within the scope of the appended claims.

What I claim is:

1. An automobile hub having an internal integral bearing-race portion formed by the exposed surface of a layer hardened by electromagnetic inductive heating from the inside, which layer is abruptly terminated and followed by a layer of material whose properties have not been affected by heating, the internal layer having a hardness manifoldly greater than the outer layer of material on the Rockwell C scale, and having furthermore that quality of martensitic hardness characterized by heating electromagnetically and quenching, each layer having its own hardness substantially uniform throughout, the change in hardness of cross section between the one layer and the other involving an intervening thickness of material relatively small as compared with the thickness of either of the two layers of widely differing hardness, and said inner layer being under compression, while the outer layer is under tension.

2. As an article of manufacture, a one-piece integral body of hollow continuous annular section having inner and outer adjoining substantially annularly extending zones differing widely in hardness but each having a hardness substantially uniform throughout its radial thickness, the inner zone being several times as hard as the outer, as measured on the Rockwell C scale, and the change in hardness from the one zone to the other is effected through a body of material substantially three-hundredths of an inch thick, the inner zone having a quality of martensitic hardness characterized by heating electromagnetically and quenching, and said inner zone being under compression while the outer zone is under tension.

3. As an article of manufacture, an integral one-piece hollow body of continuous annular cross section embodying a material hardenable by heat followed by quenching and in which the state of autofrettage exists between adjoining inner and outer zones differentiating in hardness and sharply demarked from each other by the difference in relative hardness, the said inner and outer zones being annularly extending, the inner zone having a hardness manifoldly greater than the outer zone as measured on the Rockwell C scale and that quality of martensitic hardness characterized by heating electromagnetically and quenching, each zone having its own hardness substantially uniform throughout, the change in hardness of cross section between the one zone and the other involving an intervening thickness of material relatively small as compared with the thickness of the two zones of manifoldly differing hardness, and said inner layer being under compression, while the outer layer is under tension.

4. As an article of manufacture, an integral one-piece hollow body of continuous annular cross section embodying a material hardenable by heat followed by quenching and in which the state of autofrettage exists between adjoining inner and outer zones differentiating in hardness and sharply demarked from each other by the difference in relative hardness, the said inner and outer zones being annularly extending, the inner zone having a hardness manifoldly greater than the outer zone as measured on the Rockwell C scale and that quality of martensitic hardness characterized by heating electromagnetically and quenching, each zone having its own hardness substantially uniform throughout, the change in hardness of cross section between the one zone and the other involving an intervening thickness of material relatively small as compared with the thickness of the two zones of manifoldly differing hardness, and said inner layer being under compression, while the outer layer is under tension, said body being relatively thin-walled and having a thickness of hollow cross section but a fraction of its internal diameter, the ratio of the thickness of the inner hardened zone to the thickness of the outer zone being approximately as one to three.

5. As an article of manufacture, an integral one-piece hollow body of continuous annular cross section embodying a material hardenable by heat followed by quenching and in which the state of autofrettage exists between adjoining inner and outer zones differentiating in hardness and sharply demarked from each other by the difference in relative hardness, the said inner and outer zones being annularly extending, the inner zone having a hardness manifoldly greater than the outer zone as measured on the Rockwell C scale and that quality of martensitic hardness characterized by heating electromagnetically and quenching, each zone having its own hardness substantially uniform throughout, the change in hardness of cross section between the one zone and the other involving an intervening thickness of material relatively small as compared with the thickness of the two zones of manifoldly differing hardness, and said inner layer being under compression, while the outer layer is under tension, said body having a wall at one end at least partially closing said end and having an internal circumferential groove of a radial depth at least as great as the thickness of said hardened zone, said groove being located adjacent said wall and said hardened zone being of uniform radial thickness throughout and terminating at its one end at said groove, said groove spacing said hardened zone from said wall.

HOWARD E. SOMES.